(No Model.)
S. Y. LOVE.
CREAMING CAN.
No. 375,883. Patented Jan. 3, 1888.
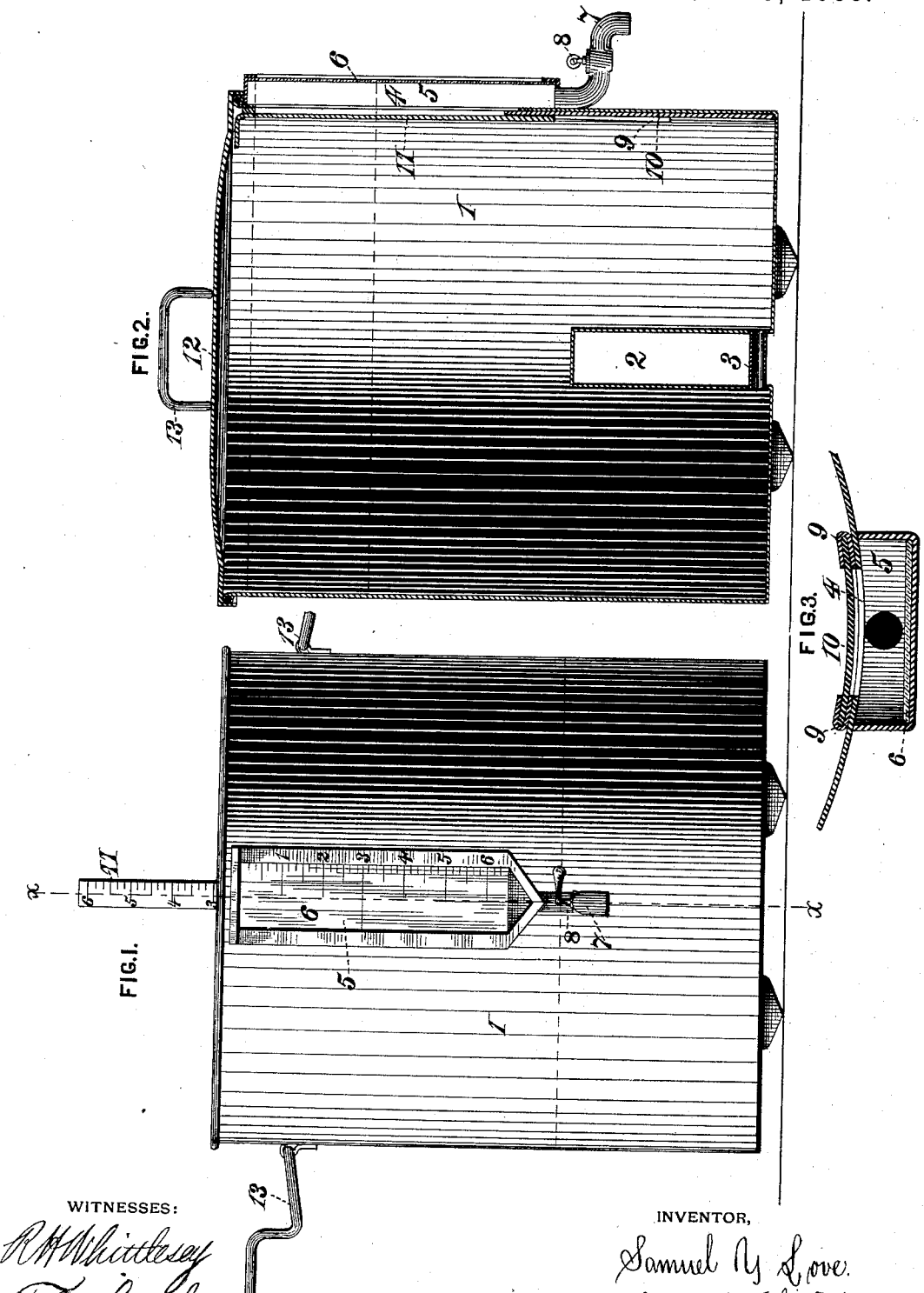

UNITED STATES PATENT OFFICE.

SAMUEL YOUNG LOVE, OF MEADVILLE, PENNSYLVANIA.

CREAMING-CAN.

SPECIFICATION forming part of Letters Patent No. 375,883, dated January 3, 1888.

Application filed April 13, 1887. Serial No. 234,590. (No model.)

*To all whom it may concern:*

Be it known that I, SAMUEL YOUNG LOVE, a citizen of the United States, residing at Meadville, in the county of Crawford and State of Pennsylvania, have invented or discovered certain new and useful Improvements in Creaming-Cans, of which improvements the following is a specification.

In the accompanying drawings, which make part of this specification, Figure 1 is a view in side elevation of my improved milk-can. Fig. 2 is a sectional elevation of the same, the section being taken through the skimmer-box. Fig. 3 is a horizontal sectional view through the skimmer-box.

The invention herein relates to certain improvements in milk-cooling cans, and has for its object such a construction of can as permits of a thorough circulation of the cooling medium over a large surface of the can, and also for a complete withdrawal of the cream from the surface of the milk without a disturbance of the milk or a commingling thereof with the cream.

To these ends the invention consists in the construction and combination of parts, substantially as hereinafter more fully described and claimed.

In the practice of my invention I form a diametrical opening or passage, 2, through the can 1, said passage being open, as shown at the bottom and sides, so as to permit a flow of the cooling medium therethrough, and the consequent more rapid cooling of the milk contiguous to the walls of said passage. In order to permit of the milk flowing from one side to the other of the partition formed by the passage 2 a pipe, 3, is arranged across the passage near the bottom of the can. This pipe connecting the portions of the can on opposite sides of the passage not only allows the milk to rise to the same level, but also permits of a circulation of the milk during the cooling thereof. In the side of the can is formed a slot, 4, extending from a point near the upper edge of the can down to a point somewhat below the probable level of the cream formation. Over this slot is secured a box or half-cylinder, 5, closed at the top and bottom and entirely inclosing the slot, and provided on its front with a glass or other transparent plate, 6, through which the milk and cream can be inspected. In the lower end of the box 5 is inserted a pipe, 7, provided with a stop-cock, 8, or other suitable valve. On opposite sides of the slot 4, and within the can, are arranged the guides 9 for the sliding plate 10, fitting snugly into said guides, so as to prevent the leakage of milk into the box around the edges of the plate when it is raised. This slide-plate is made of a sufficient length to entirely cover the slot when desired, and to its upper end is attached a handle, 11, whereby the plate may be raised and lowered, and on the front side of the handle is formed a scale, so arranged with reference to the scale on the glass front of the box 5 that the upper edge of the plate can be moved to the exact line of demarkation between the cream and milk, as seen through the glass plate. As seen in the drawings, the scale on the glass plate and the handle are reversed, for the reason that when several gages of cream are indicated on the glass a smaller upward movement of the plate 10 is necessary than when only one or two gages are indicated. The upper edge of the can is employed as the reference-point for the scale in the handle.

In using my improved can, the fresh milk is poured therein, the plate 10 being pushed down to its lowest limits, so as to permit the milk to have free access to the box 5, and the cock or valve 8 is closed. The top 12 is then secured in place by the pivotal clamps 13, and the can is then placed in a cooling medium, preferably running water, in such a position that water can flow through the passage 2. After the cream has separated from the milk and risen to the surface, the depth of cream being indicated by the scale of the glass front of the box 5, the plate 10 is raised until its upper end is in line with the plane of separation between the milk and cream. This can readily be done by reference to the scale on the handle 11, as above described. The valve 8 is opened, thereby permitting the cream, which is above the end of the plate 10, to flow through the box 5 into a receptacle placed under the pipe 7. As the joints between the plate 10 and the walls of the can are made tight, no milk, except the small quantity within the box, will flow into the receiving-vessel, as the plate 10 will act as a dam, preventing any movement of milk below its upper end.

I am aware that milk-cans have been made having a glass plate the entire or part of the length of the can and provided with an outlet at the bottom for the withdrawal of the milk and then the cream; but such construction is objectionable, for the reason that as the milk and cream are lowered in the can a large portion of the cream adheres to the sides of the can. And I am also aware that milk-cans have been made with a recess extending from one side partially through the can, and hence do not claim such a construction.

I claim herein as my invention—

A milk-can having a slot formed in the side thereof, in combination with a box having a transparent side, inclosing said slot and provided with an outlet, and a movable dam or plate for closing said slot, the transparent portion of the box and the slide being provided with a graduated scale, substantially as set forth.

In testimony whereof I have hereunto set my hand.

SAMUEL YOUNG LOVE.

Witnesses:
J. B. COCHRAN,
CHAS. P. JOHNSON.